United States Patent [19]

Snodgrass

[11] 4,166,654
[45] Sep. 4, 1979

[54] VEHICLE BRAKING SYSTEM

[76] Inventor: Michael P. Snodgrass, 604 Dudley St., Blanchester, Ohio 45107

[21] Appl. No.: 771,556

[22] Filed: Feb. 24, 1977

[51] Int. Cl.² ........................................... B60T 11/18
[52] U.S. Cl. .................................. 303/14; 188/151 A
[58] Field of Search .................. 303/6 R, 6 A, 9, 13, 303/14, 15; 188/151 A

[56] References Cited

U.S. PATENT DOCUMENTS

| | | | |
|---|---|---|---|
| 3,015,522 | 1/1962 | Spikes | 303/9 |
| 3,129,036 | 4/1964 | Price et al. | 303/15 |
| 3,520,136 | 7/1970 | Stiward | 303/6 R |
| 3,572,847 | 3/1971 | Luft | 303/13 |
| 3,582,150 | 6/1971 | Williams et al. | 303/13 |

FOREIGN PATENT DOCUMENTS

| | | | |
|---|---|---|---|
| 629222 | 12/1961 | Italy | 303/13 |
| 1152853 | 5/1969 | United Kingdom | 303/9 |

*Primary Examiner*—Edward R. Kazenske
*Attorney, Agent, or Firm*—Mahoney & Stebens

[57] ABSTRACT

A vehicle braking system is provided having alternate, automatically selected actuating fluid circuits, either hydraulic or air circuits, interconnected between a master brake cylinder actuated by a vehicle operator and a brake actuating cylinder that operates the brake shoes at a wheel of the vehicle. A first actuating fluid circuit is normally connected in communicating relationship between the master cylinder and actuating cylinders by fluid-pressure responsive valves. Failure in buildup of fluid pressure in the first circuit when the master cylinder is actuated, such as would be due to a break or leak in the primary actuating fluid line, results in automatic operation of the valves to interconnect a second circuit in bypass relationship to the first circuit. The pressure responsive valves are not operational unless the brake master cylinder is being actuated. Once the valves have been actuated due to a failure in the first circuit, these valves remain in the position where the second circuit remains interconnected and the vehicle may continue to be operated with a fully operational fluid brake system. A modified form of the system is adaptable to accommodating a brake lockup mechanism in the automatically responsive system.

28 Claims, 4 Drawing Figures

VEHICLE BRAKING SYSTEM

BACKGROUND OF THE INVENTION

Vehicle braking systems either of the hydraulic or air type, such as are commonly utilized and employed in automotive vehicles, generally comprise a master brake cycliner or valve which is interconnected in fluid communicating relationship with brake actuating cylinders mechanically coupled with the brake shoes at each respective wheel. In its simplest form, a fluid brake system merely comprises a single actuating fluid line interconnecting a master brake cylinder with the brake actuating cylinders. In a basic hydraulic fluid system, both master brake cylinder and brake actuating cylinders are cylinder and piston units with the pistons mechanically coupled, respectively, to either a brake pedal or to the brake shoes. Accordingly, operation of the brake pedal moves the master cylinder piston and thereby displaces and pressurizes the fluid through the brake system. Each of the brake actuating cylinders, coupled with the brake shoes at the respective wheels, will thus be operated through displacement of the pressurized actuating fluid from the master cylinder. A fluid reservoir is generally associated with the master brake cylinder to provide any necessary make-up fluid that may be required to replace system losses.

A substantial disadvantage of such a conventional basic hydraulic brake system is that it is unable to accommodate or compensate for a massive leak or rupture of the actuating fluid conduits interconnecting the master cylinder with the brake actuating cylinders. A substantial leak in the system, such as a rupture of the fluid line, results in a total failure of the brake system. In an automotive vehicle such as the usual family type car, a secondary or auxiliary brake system is normally not provided, and failure of the brake system is, in effect, a complete loss of braking capability. The only emergency brake system available is the so-called parking brake which is relatively ineffective in decelerating a fast moving vehicle.

Other types of vehicles through necessity resulting from type of use, such as school busses, may be provided with a reasonably effective emergency or alternate braking system. An alternate braking system may comprise a mechanical linkage to secondary braking shoes or an over-ride with respect to the brake shoes that are normally actuated by hydraulic cylinders. While the concept of such an alternate or emergency brake system appears to effectively attain the objective, there is an inherent disadvantage in that alternate mechanical brake systems require substantially greater efforts to operate than a hydraulic or air system. Also, an alternate system requires a substantial amount of time to operate as the operator must switch from one to the other and this is a particularly undesirable distraction from driving activities at a very critical time. There is a substantial time lag from the time the operator has ascertained that a primary fluid actuated brake system has failed and that it will be necessary for him to slow down and stop the vehicle through operation of a mechanical or other alternate system.

There has been some attempt to provide an alternate hydraulic braking system to perform the function of an emergency brake system. An example of such prior patented attempts is exemplified in U.S. Pat. No. 3,015,522 issued to R. B. Spikes on Jan. 2, 1962. In the system of the Spikes' patent, the master brake cylinder may be selectively and alternatively connected in fluid communicating relationship with dual brake actuating cylinders in the respective wheels by means of a solenoid actuated valve. This valve is actuated by an electric solenoid which is energized by means of an electrical switch operated by a mechanical linkage between the brake pedal and the master brake cylinder. Operation of the selector valve to interconnect the alternate hydraulic circuit with the master brake cylinder is determined by the degree of travel of the brake pedal. If the brake pedal is displaced beyond a predetermined point, it actuates the electrical switch thereby energizing the electrical solenoid and operating the selector valve to interconnect the alternate hydraulic circuit. While this system does provide an alternate hydraulic circuit arrangement for the purpose of safety, system operation is predicated on a physical displacement of the master brake cylinder beyond a predetermined point. If the brake system needs servicing to bleed air, the brake pedal may be sufficiently displaced to operate the electrical switch even though the alternate brake system is not required. If the system is losing fluid or has a massive rupture in the lines, the master brake cylinder will first displace a substantial amount of the fluid in the lines through the rupture before the apparatus senses this condition and operates the selector valve. As a consequence, the master brake cylinder may not have an adequate quantity of hydraulic fluid with which to then operate the brakes through the alternate system.

SUMMARY OF THE INVENTION

In accordance with this invention a secondary fluid system is incorporated to provide an alternate braking system in the event of rupture or leakage in the primary hydraulic or air circuit. In a basic embodiment of a hydraulic fluid actuated brake system, the system comprises a secondary or alternate hydraulic fluid circuit which is alternatively interconnected with the master brake cylinder and the brake actuating cylinders by fluid-pressure responsive valves. These pressure responsive valves are sensitive to the fluid pressure in the primary or first hydraulic circuit and, in the event fluid pressure fails to increase substantially in this circuit upon initial operation of the brake pedal thereby indicating a loss of fluid, the valves will be automatically operated to disconnect the primary hydraulic circuit and interconnect the secondary circuit to permit continued operation of the vehicle with a fully functional brake system. One of the valves is electric-solenoid actuated and the solenoid is connected in circuit with a pressure sensing switch coupled with the primary hydraulic circuit and responsive to the fluid pressure therein. This electrical circuit is energized at the initial instant the brake pedal is operated, but the valve will not be actuated unless the hydraulic pressure does not build up within the primary hydraulic circuit. The fluid pressure normally begins to rise immediately upon actuation or displacement of the master brake cylinder piston, and thus a failure in the primary system preventing a sufficient rise in the brake pressure will result in almost instantaneous actuation of the pressure responsive valve to interconnect the alternate system.

This solenoid actuated valve may be disposed in relatively close physical relationship to the master brake cylinder to more completely isolate and separate the two hydraulic circuits or lines. Further isolation of the lines at the brake actuating cylinder is accomplished by means of a shuttle valve. The shuttle valve is responsive to the fluid pressure and automatically closes the primary hydraulic circuit at the wheel when the secondary circuit is pressurized.

This alternate or secondary hydraulic circuit thus provides a substantial degree of safety utilizing the existing brake cylinder and brake actuating cylinders. While this system does not eliminate or provide against internal failures of either of these two components, it does provide a reliable emergency system for the more common failure of rupturing of the hydraulic lines interconnecting these components. Also, the system is fully automatic with the secondary circuit selected without necessity of the vehicle operator first determining that the primary system has failed and then taking positive action to place the alternate or secondary system in operation.

A modification of this basic apparatus using dual master brake cylinders and dual brake actuating cylinders provides a more complete emergency or alternate system although relatively more costly. The operation of a dual component system is essentially the same as for the basic system but with the advantageous improvement of also using alternate master and actuating cylinders.

Another embodiment of this invention illustrated and described is an air brake system. An air brake system is essentially the same as a hydraulic system but includes, in addition to the brake shoe actuating cylinders, a brake lock-up mechanism. Operation of an air brake system embodying this invention is substantially the same as the two hydraulic systems but the apparatus includes a mechanism and control system to prevent the automatic lock-up of brakes upon loss or substantial decrease in the primary system air pressure.

Each of the inventive systems provides a substantial degree of reliability in a vehicle braking system. The system is automatically operable in sole response to fluid pressure in the system, thereby eliminating any necessity for operator control thereby avoiding the usual time lag and further fluid loss that accompanies the known systems heretofore used or patented. Also, each system provides a secondary or auxiliary braking system which permits the vehicle to be continued in operation although the vehicle will not then have an auxiliary system in the event of a subsequent failure. It will also be noted that this invention may also be readily incorporated in brake systems and apparatus other than that specifically illustrated and described to obtain the advantageous improvements in safety and capability of continued vehicle operation with a fully functional brake system.

These and other objects and advantages of this invention will be readily apparent from the following detailed description of embodiments of the invention and the accompanying drawings.

DESCRIPTION OF THE DRAWING FIGURES

DETAILED DESCRIPTION OF THE ILLUSTRATED EMBODIMENTS

Figure 1:
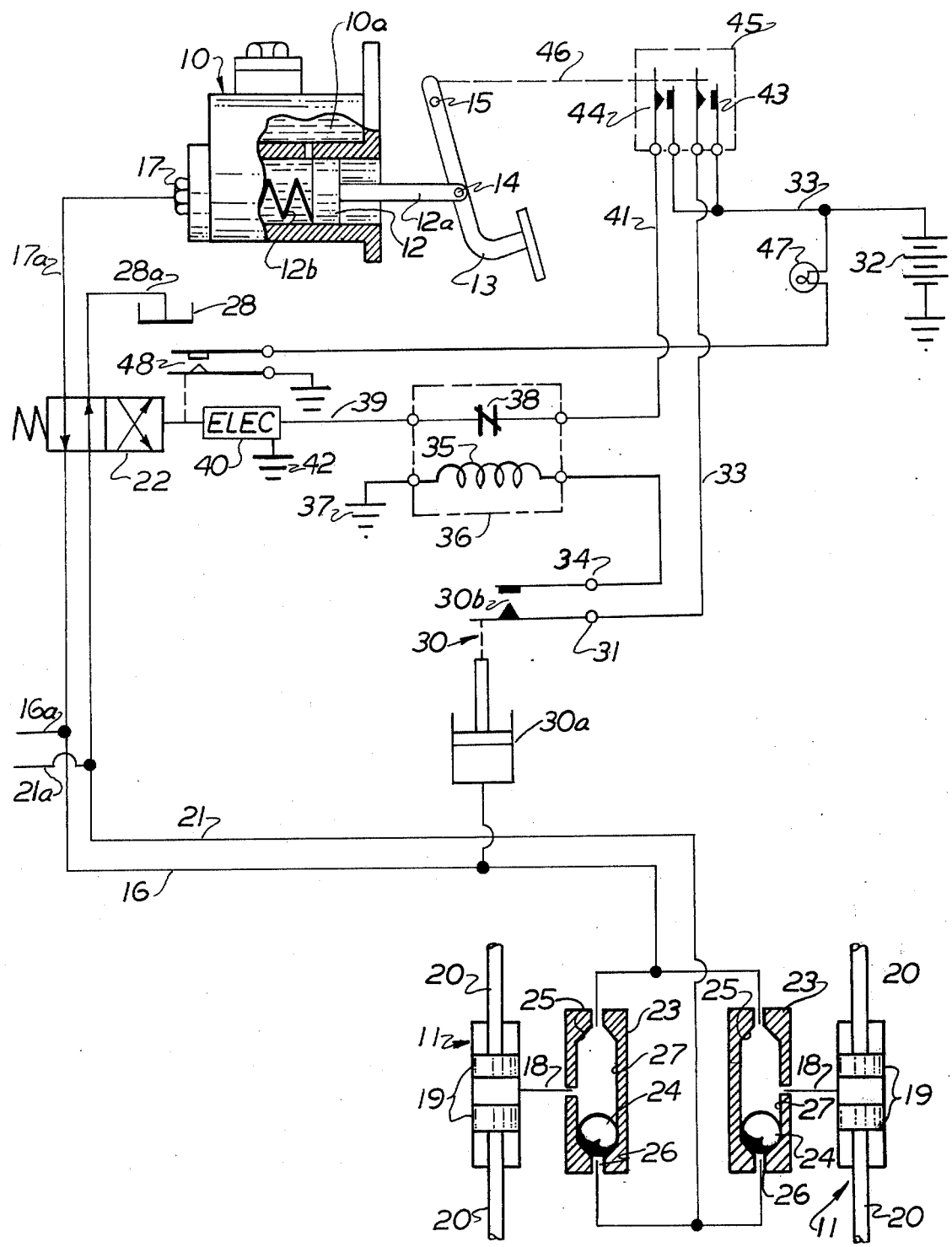
FIG. 1 is a schematic diagram of a hydraulic brake system embodying this system.

Referring to FIG. 1, a basic hydraulic brake system for an automotive vehicle is diagrammatically illustrated and is seen to incorporate the emergency or alternate circuit in accordance with this invention. Included in the primary system are the basic components of a master brake cylinder 10 and the brake actuating cylinders 11 for the brake shoes associated with one pair of wheels (not illustrated). The specific mechanical interconnection of the brake actuating cylinders 11 with the brake shoes associated with the respective wheels is not illustrated as such constructions are well known. Also, the illustrated embodiment is merely related as to one pair of wheels, such as the rear wheels, without indicating the specifics of the brake system associated with the front wheels. It will be apparent that the system may be duplicated as to the front wheels or a further alternate system selection arrangement as between the front and rear wheels may be utilized.

Mechanically coupled with a piston 12 in the master brake cylinder is a piston rod 12a which extends axially from one end of the master cylinder. This piston rod 12a is mechanically coupled with a brake pedal 13 located in the driver's compartment of the vehicle through a suitable linkage or interconnection 14. The brake pedal 13 is pivotally mounted at 15 on an element of the vehicle structural frame where it may be conveniently operated by the driver's foot. The master cylinder 10 also includes a fluid reservoir 10a having sufficient capacity to compensate for minor system losses.

Interconnecting the master cylinder 10 with the respective actuating cylinders 11, is a primary hydraulic circuit comprising a fluid conduit 16. The conduit 16 connects with a pressure port 17 of the master cylinder through a preferably relatively short interconnecting conduit 17a and also interconnects with an inlet port 18 through a passage or conduit at each of the respective brake actuating cylinders. Each of the brake actuating cylinders 11 may be of the double piston type as illustrated having separate pistons 19 and piston rods 20 connected with the respective brake shoes (not shown).

Operation of this basic system is that actuation of the brake pedal 13 moves the master cylinder piston 12 to pressurize and displace hydraulic fluid within the conduit 16. This displacement of hydraulic fluid results in displacement of the brake cylinder pistons 19 with consequent extension of the piston rods 20 in opposite direction and employment of the wheel brakes. A mechanical spring is normally incorporated with the brake shoes to a non-operative position with return movement of the pistons 19 toward each other and displacement of brake fluid to the master cylinder 10. A spring 12b may also be included in the master cylinder 10, or an exterior spring (not shown) may be connected to the brake pedal, to return the brake pedal 13 to its initial position once the driver's foot is removed from the brake pedal 13.

In accordance with this invention, a secondary or auxiliary hydraulic circuit is provided for alternate use in the event of a rupture or leak in the primary hydraulic circuit. This secondary hydraulic circuit includes a conduit 21 which parallels conduit 16 of the primary system and therefore extends from a point substantially adjacent the master brake cylinder 10 to the inlet port 18 at the brake actuating cylinders 11. Conduit 21 is preferably physically separated from conduit 16 to the maximum extent practicable to better avoid simultaneous damage. Also, conduit 21 is normally hydraulically disconnected from the system although it will be filled with hydraulic fluid. Hydraulic disconnection of conduit 21 is effected by a valve 22 positioned as closely adjacent the master brake cylinder as is feasible and connecting with the conduits 16, 17a and 21. A shuttle valve 23 associated with each brake actuating cylinder 11 interconnects with the conduits 16 and 21 immediately adjacent the inlet ports 18 of the brake actuating cylinders 11 and function to alternatively close one of the conduits 16 or 21 at the respective brake cylinder.

The valve 22 is an electric solenoid-operated, two position valve. This valve, in its illustrated normal position, provides free flow in the conduit 16 between the master brake cylinder 10 and the brake actuating cylinders 11. When actuated to its second position, this valve disconnects conduit 16 from the master cylinder port 17 and connects conduit 21 with the master brake cylinder through conduit 17a. Pressurized fluid will then be displaced through the conduit 21 when the master brake cylinder 10 is actuated and the pressurized fluid will operate the shuttle valves 23 to close the primary conduit 16 in the immediate vicinity of the brake actuating cylinders 11.

The shuttle valves 23 comprise a ball type check 24 which is displaced into closing relationship with either of two ports 25 and 26 of an elongated valve chamber 27 depending upon whether conduit 16 or 21 is pressurized at a particular instant. The brake cylinder inlet ports 18 communicate with the chamber 27 intermediate the ports 25 and 26 thereby resulting in free fluid flow from the one port to the brake cylinder. Normally, the ball check 24 would be displaced into closing relationship to the port 26 connecting with auxiliary conduit 21 as a result of pressurized fluid in conduit 16. However, a loss of fluid in conduit 16, and subsequent pressurization of fluid in conduit 21, results in the displacement of the ball check 24 to close port 25 connecting with conduit 16 and thereby place conduit 21 in fluid communication with the inlet port 18 of the respective brake cylinders 11.

It will be noted that the valve 22 is operable to connect either conduit 16 or 21 to conduit 17a leading from the master cylinder port 17. Concurrently, this valve is operable to connect the other of the two conduits, 21 or 16, to an auxiliary hydraulic reservoir 28 through conduit 28a. This interconnection with an auxiliary reservoir 28 results in the secondary conduit 21 being maintained completely filled at all times, thereby assuring positive operation of the alternate system immediately upon actuation of valve 22. Also, the valve 22 functions in the actuated position to connect the primary conduit 16 to the reservoir 28 thereby venting that conduit and positively enabling displacement of the ball checks 25 in the shuttle valves 23.

Automatic operation of the system to alternatively select the secondary hydraulic circuit is effected through an electrical circuit. This electrical circuit includes a pressure responsive switch 30 having an actuating unit 30a which is connected in operating relationship to the conduit 16. The switch 30 also includes a set of normally open contacts 30b that will close when the fluid pressure in the conduit 16 rises to a predetermined value. One element of the switch contacts 30b is connected at a terminal 31 to a suitable source of electrical power such as the vehicle's battery 32 through an electrical conductor 33. The other element of the switch contacts 30b is connected at terminal 34 to one side of an operating coil 35 of a relay switch 36. The other side of the relay operating coil 35 is grounded at 37 to the vehicle chassis frame to complete the electrical circuit. The relay switch 36 includes a set of normally closed contacts 38 having respective terminals with one terminal being connected by a conductor 39 to the operating solenoid 40 of the valve 22, and the other terminal being connected to the battery 32 by a conductor 41 which connects into conductor 33. One side of the operating solenoid 40 of valve 22 is grounded at 42 to complete the electrical circuit.

Interconnected in each of the conductors 33 and 41 are respective normally open switch contacts 43 and 44. These two switch contacts 43 and 44 are preferably incorporated in a single switch structure 45 which is mechanically coupled with the brake pedal 13. The actuating arm or connecting linkage 46 for the switches 43 and 44 is positioned relative to the brake pedal such that the brake pedal, during the initial stages of its movement in actuation of the master cylinder, will close both switch contacts. Both switches will remain closed throughout the remainder of the brake pedal travel until such time as the brake pedal again returns to its initial position.

The function of the switches 43 and 44 is to prevent inadvertent operation of the valve 22. In the circuit of this invention, these switches maintain the electrical circuit in an open condition at any time that the brake pedal is not displaced from its normal, unactuated position. When in this position, with the switch contacts 43 and 44 open, electrical power will not be supplied to either the relay solenoid 35 or to the valve solenoid 40. Consequently, maintenance of the contacts of pressure responsive switch 30 in a closed configuration, in view of a low or non-existent fluid pressure in conduit 16, will not result in actuation of valve 22 since its coil 40 will not be energized due to the switch contacts 44 being open.

However, actuation or displacement of the brake pedal 13 results in closing of the contacts 43 and 44 while concurrently pressurizing the hydraulic fluid in conduit 16. An electrical circuit is thereby completed to switch 30 and the increase in fluid pressure in conduit 16 will close the contacts 30b of that switch through its actuating unit 30a and energize the operating coil 35 of relay 36. Energization of relay coil 35 results in opening of its contacts 38 and interruption of the electrical circuit to the solenoid 40 of valve 22 that would otherwise be completed through closing of switch contacts 44. Consequently, valve 22 will not be actuated to interconnect the second hydraulic circuit 21 to the master brake cylinder 10 while the primary conduit 16 remains capable of being pressurized. The switch structure 45 is arranged relative to the brake pedal 13 so that the contacts 43 and 44 will not be closed until the master cylinder piston 12 has been displaced sufficiently to increase fluid pressure to a valve where the pressure responsive switch 30 will be actuated to close its contacts. This delay in operation of the contacts 43 and 44 is a relatively short period of time so that transfer of brake operation to the alternate circuit will occur without appreciable time lag if failure of the conduit 16 occurs prior to initiating operation of the brake pedal 13.

If the primary hydraulic circuit comprising conduit 16 experiences a fluid leak, operation of the brake pedal 13 will most likely not result in an increase in fluid pressure in conduit 16. In this situation, the switch 30 will not be actuated leaving its contacts open and thereby prevent energization of the relay coil 35. Accordingly, the contacts 38 of the relay 36 will remain closed and an electrical circuit will be completed to the operating solenoid 40 of the valve 22 since the switch contacts 44 will also be closed at this time. Energization of the solenoid 40 of valve 22 results in displacement of the valve to its alternate position and in that alternate position, interconnect conduit 21 between the master brake cylinder 10 and the shuttle valves 23. Pressurized hydraulic fluid is thus displaced in conduit 21 resulting in shifting of the shuttle valve ball checks 24 to the alternate position closing ports 25 and opening ports 26 thereby completing a fluid circuit to the brake actuating cylinders 11.

The conduit 21 is normally connected through valve 22 to the auxiliary reservoir 28 containing hydraulic fluid to assure that conduit 21 will be completely filled with fluid. Actuation of valve 22 will thus shift the valve's spool to interconnect the conduit 21 with the master cylinder while connecting conduit 16 with the auxiliary reservoir 28. Venting of conduit 16 at valve 22 will thus assure operation of the shuttle valves 23 since formation of a liquid lock is prevented regardless of the condition of conduit 16 which may have prevented operation of the pressure switch 30.

Preferably the valve 22 is of a type provided with a mechanical interlock (not shown) such that, when once shifted to its alternate position, it will not automatically return to the initial position when the brake pedal 13 is released and the electrical circuits are de-energized. This avoids any further incremental loss in hydraulic fluid through continued alternate interconnection of the first and second hydraulic circuits with the master brake cylinder. However, the valve 22 will be manually reset to its illustrated normal position through unlocking of the latch at the time of repairing the brake system.

An electrical indicating or warning circuit may also be provided to advise the vehicle operator of the systems operation. A suitable indicating circuit may include the series connected warning light 47 and normally open switch contact 48 mechanically coupled with the operating components of valve 22. Switch contact 48 is closed when valve 22 is actuated resulting in illumination of the light 47 which is located on the vehicle's control panel.

While the embodiment illustrated is only shown as interconnected with the brakes of a single pair of wheels, it will be understood that the apparatus would most likely be applied to a vehicle with four wheels mounted in pairs on front and rear axles. This was previously indicated and the interconnection of the described circuit could comprise a branch conduit 16a leading to the brake cylinder on another axle by a fluid circuit arrangement including shuttle valves similar to that which is illustrated in FIG. 1. In the same manner, a second or auxiliary conduit 21a could be provided for alternate brake operation. For further enhancement of safety, the conduits 16a and 21a could be connected ahead of the valve 22 and a complete duplicate hydraulic and electric circuit provided for the wheels on the other axle.

Figure 2:
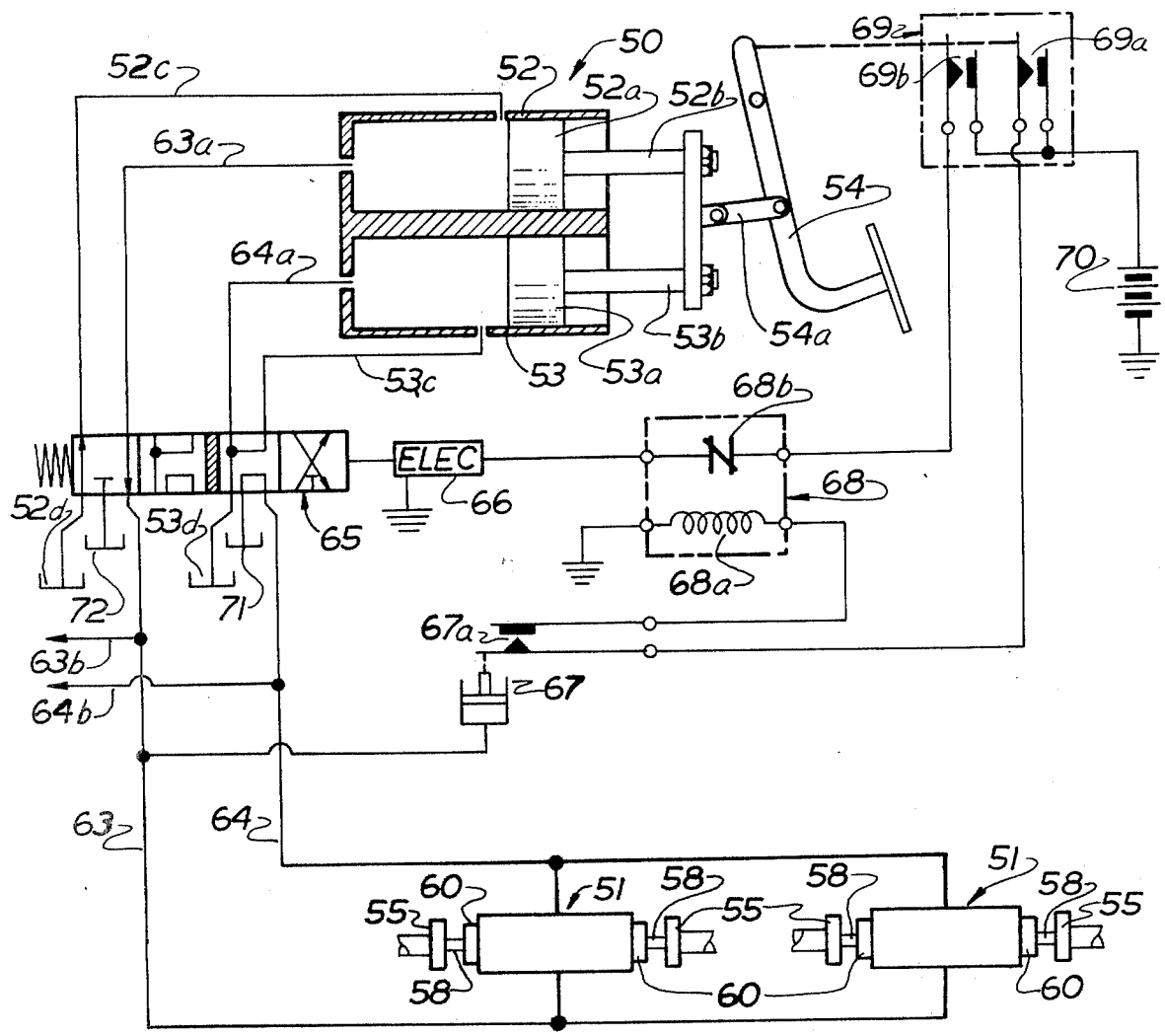
FIG. 2 is a schematic diagram of modified hydraulic brake system embodying this invention.

A modified brake emergency system embodying this invention is illustrated in FIG. 2. In this modified system, the master brake cylinder 50 and the brake actuating cylinder 51 are dual component units in that each includes two separate cylinder and piston units. The master cylinder 50 includes two separate and hydraulically isolated cylinder and piston units 52 and 53, having their respective pistons 52a and 53a and associated piston rods 52b and 53b mechanically interconnected to a brake pedal 54 by a mechanical linkage 54a for simultaneous and concurrent operation. Each of the cylinder and piston units 52 and 53 is connected by conduits 52c and 53c to a respective hydraulic fluid reservoir 52d and 53d.

The brake actuating cylinders 51 also each include two separate and hydraulically isolated cylinder and piston units combined into a single unitary structure. Details of a typical mechanical structure and elements of a brake actuating cylinder 51 can be best seen in FIG. 3. Each of the brake actuating cylinders 51 is a dual unit that is double ended and has respective piston rods at each end which are not mechanically connected with each other but are each adapted for mechanical coupling with the brake shoes for operation thereof when either the primary or secondary hydraulic circuit is operating. This mechanical coupling with the brake shoes includes a bearing plate 55 connected with a respective brake shoe (not shown) at the opposite ends of the actuating cylinder. It will be understood that each brake shoe assembly is also provided with a mechanical spring which normally urges the pair of bearing plates 55 toward the adjacent end of the brake cylinder.

Figure 3:
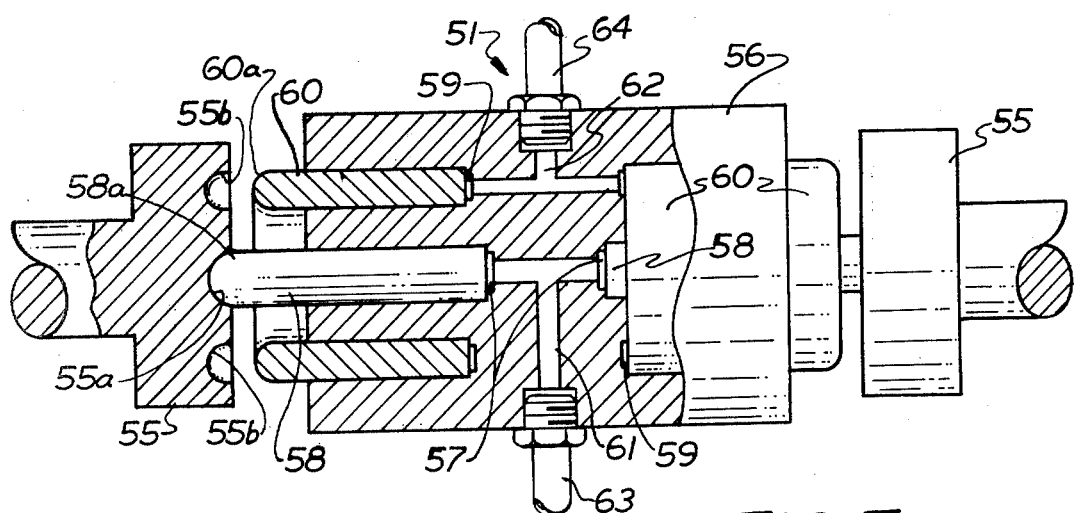
FIG. 3 is a medial, longitudinal sectional view of the dual brake actuating cylinder of the embodiment of FIG. 2.

Referring to FIG. 3, it will be seen that each brake actuating cylinder 51 comprises a housing 56 having a pair of opposed elongated cylinder chambers 57 that are coaxially aligned with outwardly opening ends. Disposed in each cylinder chamber 57 for axially reciprocation therein is an elongated piston 58 having an outer ball-shaped end 58a that is adapted to cooperatively interfit in a hemispherical socket 55a formed in an end face of a respective bearing plate 55. Also formed in the housing 56 are two opposed cylinder chambers 59 that are annular rings disposed in coaxial alignment with the elongated cylinder chambers and which open at respective ends of the housing. Disposed in each annular cylinder chamber 59 is a respective piston 60 which is also of cylindrical ring form and having the outer end 60a thereof arcuately curved to interfit in a circular recess 55b formed in the end face of a respective bearing plate 55. The pistons 58 and 60 are of lengths such that the cylindrical ring piston 60 does not project from the housing as far as the piston 58 so that the latter is normally in contacting engagement with the bearing plates 55. This coaxial configuration is of advantage as eccentric loading forces are avoided regardless of which cylinder and piston combination may be utilized. Also, either piston may be extended without displacement of the other as a consequence of the independent mechanical coupling of the pistons 58 and 60 with the bearing plate 55 which permits either piston to function without interference from the other.

Fluid passageways 61 and 62 are also formed in the housing 56 to permit external connection with the conduits that interconnect with the master cylinder 50 whereby pressurized fluid may be routed to the cylinder chambers 57 and 59 to effect extension of the respective pistions 58 or 60. The one passageway 61 communicates with the centre cylinder chambers 57 whereas the other passageway communicates with the ring cylinder chambers 59. Application of pressurized fluid to a particular passageway will thus result in extension of the respective piston 58 or 60. Only one piston, 58 or 60, is extended at any instant and it will be seen that the ball and socket coupling with the bearing plate 55 enables either piston to operate without interference from the other.

Interconnecting the primary brake master cylinder 52 with the primary brake actuating cylinders 57 through passageway 61 is a primary conduit 63, while a secondary conduit 64 interconnects the alternate or secondary master cylinder 53 and secondary brake cylinders 59 through passageway 62. Interconnected with the conduits 63 and 64 is a two position, solenoid actuated valve 65 which maybe of a spool type. The spool is shifted by means of an electrical solenoid 66 which is interconnected into an electrical control circuit of the same type and operation as described in the first embodiment. This electrical circuit includes the pressure responsive switch 67 coupled with the conduit 63, a relay switch 68 and a brake pedal switch 69 having the two normally open switch contacts 69a and 69b that are connected in circuit with the vehicle battery 70.

The valve 65 has a spool that is selectively positionable in either of two positions with the fluid flow for the normal position being illustrated. In this normal position, primary conduit 63 is connected to a branch conduit 63a coupled with an outlet port of primary master cylinder 52 thereby forming a complete hydraulic circuit between the master cylinder and the brake cylinders 51. Additionally, the valve 65 in this normal position connects the primary master cylinder 52 to its hydraulic fluid reservoir 52d through branch conduit 52c. In this position, valve 65 also connects conduit 64 to an auxiliary reservoir 71, thus assuring that conduit 64 will be filled with fluid for immediate operation. The secondary master cylinder 53 is connected to reservoir 53d through a branch conduit 64a and branch conduit 53c is also connected to reservoir 53d by valve in this position. Consequently, operation of the brake pedal 54 is only effective as to the primary master cylinder 52 and the primary brake cylinders 57. While the secondary master cylinder piston 53a is also axially displaced concurrently with the primary piston, this secondary cylinder is ineffective as fluid displaced by its piston is merely displaced to and from its reservoir 53d.

Loss of hydraulic pressure in conduit 63, or in the associated master cylinder 52, brake cylinder 51 or branch conduit 63a, will result in actuation of the valve 65 in the same manner as described in conjunction with the first illustrated embodiment of this invention. Specifically, the pressure switch 67 is not actuated thereby leaving its associated contacts 67a open and preventing energization of the coil 68a of the relay switch even though the brake actuated switch contacts 69a are now closed. The contact 69b now being closed completes an electrical circuit through the closed relay switch contacts 68b to energize the valve actuating solenoid 66.

The spool of valve 65 will thus be shifted to its second position by energization of the solenoid and, in this second position, with the spool also preferably mechanically locked into position, the secondary conduit 64 will be connected to the second master cylinder 53 through its branch conduit 64a. Reservoir 53d will now be connected by conduit 53c to master cylinder 53 to assure that a sufficient quantity of hydraulic fluid is available for actuation of the brakes. Also, valve 65 now connects branch conduit 63a with the reservoir 52d thus permitting fluid flow to and from the primary master cylinder 52 and preventing lock-up of the master cylinder 53 which is mechanically interconnected to the primary cylinder. Furthermore, valve 65 now connects conduit 63 to an auxiliary reservoir 72 thereby venting that conduit and assuring that the conduit 63 will not be pressurized and interfere with brake operation. With the valve spool thus positioned, it will be seen that actuation of the brake pedal 54 will pressurize the fluid in conduit 64 and result in extension of the cylindrical ring pistons 60 into engagement with the bearing plates 55 and employment of the brakes. The pistons 58 readily disengage from the bearing plates 55 and do not interfere with brake operation.

The advantage of the modified system shown in FIG. 2 over that of FIG. 1 is that the master cylinder and brake cylinder components are also changed at the time a failure is detected in the primary brake circuit. This further enhances the safety of the brake apparatus in that a complete auxiliary brake system is automatically and quickly substituted. Also, the auxiliary system is fully capable of remaining in operation to permit continual operation of the vehicle until the vehicle can be driven to a repair facility.

It will also be understood that the system illustrated in FIG. 2 may also be utilized to operate the brakes that may be installed on other axles of the vehicle. For example, each of the conduits 63 and 64 may be provided with branch conduits 63b and 64b connected downstream from the valve 65 and to brake actuating cylinders similar to the illustrated cylinders 51 but installed on another axle. Alternatively, a completely separate and duplicate system could be provided for operation of the brakes on other axles. For such a system, a second master brake cylinder similar to that of the illustrated cylinder 50 would be provided and have its pistons mechanically coupled with the same brake pedal 54 for simultaneous operation. The second system would also include its own independently operable valve and pressure sensing control system.

Figure 4:
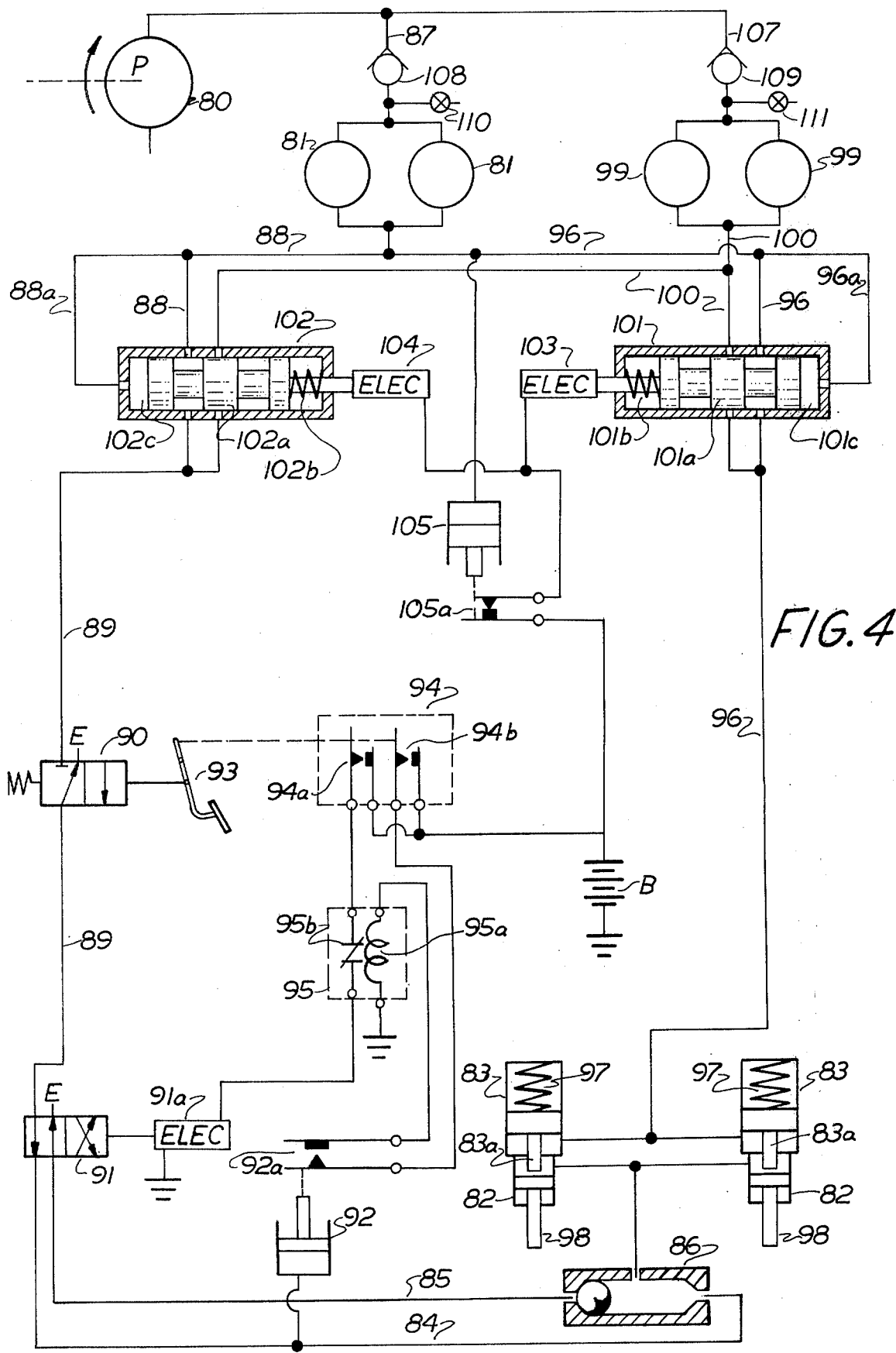
FIG. 4 is a circuit schematic of an air brake system embodying this invention.

Another embodiment of a brake system embodying this invention is illustrated in FIG. 4. The system illustrated is that specifically adapted to the air brake systems found on larger vehicles such as trucks and busses. Air brake systems of this type include an engine driven compressor 80, one or more reservoir tanks 81, brake cylinders 82 associated with the individual wheel brakes on an axle such as the rear axle and a lockup brake cylinder 83. In the illustrated embodiment, the normal brake cylinders 82 are shown connected into the system by the more advantageous dual safety system similar to that described in connection with the FIG. 1 hydraulic system. In this air system, essentially the same components are incorporated with a primary air conduit 84 and a secondary air conduit 85 connecting with the opposite ports of a shuttle valve 86. Normal operation of the air system results in a flow of compressed air from the compressor 80, or the reservoir tanks 81, through the interconnecting conduits 87, 88, 89 and 84 to the shuttle valve 86 and brake cylinder 82. A two position valve 90 interposed in conduit 89 performs the normal brake actuation control functions of pressurizing or de-pressurizing the brake cylinders 82. This valve 90 is equivalent to the master brake cylinder in the hydraulic systems and is mechanically operated by the vehicle operator.

Interposed in the conduit 89 leading to the primary air conduit 84 that connects with the brake cylinders 82, is an electric solenoid actuated valve 91 which also is a two position type, preferably having a mechanical interlock in the second position to be maintained in the second position when attained, and functions in the same manner as the solenoid actuated valve in the hydraulic circuit of FIG. 1. This valve is shown positioned in the first position where it freely allows air pressure to build up in the conduits 89 and 84 for actuation of the brakes.

In the event that air pressure should be lost in conduit 84 due to a leak in that portion of the system, this loss of air pressure is detected and sensed by a pressure switch 92 connecting with that conduit. This pressure switch is provided with a normally open set of contacts 92a which are electrically interconnected in a circuit similar to that illustrated in FIG. 1 for control and energization of an operating solenoid 91a for valve 91. Specifically, actuation of a brake pedal 93 mechanically coupled with the valve 90 also closes normally open switch contact 94a and 94b of a switch 94 to permit operation of the circuit as previously described in conjunction with FIG. 1. This circuit connects with a vehicle battery B and also includes the relay switch 95 having an operating coil 95a and normally closed contacts 95b.

As previously indicated, the air brake system on trucks and busses usually includes a lockup brake cylinder 83. This lockup brake cylinder 83 is normally pressurized through a conduit 96 which is also pressurized by the engine driven compressor 80 through the reservoir tanks 81. This lockup cylinder, however, operates in reverse manner to the normal brake system as it includes a mechanical spring 97 which operates to normally extend the brake shoe actuating shafts 98 which may be the piston rods of the brake cylinders 82. When this air pressure in the system is below a predetermined value, the mechanical spring 97 is oerative and actuates a mechanical coupling 83a of the locking cylinder to activate the brakes. When the air system is charged to a predetermined pressure, such as 60 PSI or more, this pressurized air enters the lockup cylinder 83 with the mechanical spring 97 to compress that spring and permit retraction of the brake shoe actuating shafts. Thus, when the system is charged and normally operating the lockup cylinder remains inoperative. Generally, the structures are combined so that the lockup cylinder is mechanically coupled and associated with the normal brake shoe actuating shaft. This mechanical interconnection is not shown in detail as the structural arrangement is well-known.

To also incorporate the auxiliary braking system with the lockup brake cylinder 83, it is necessary to prevent the inadvertent locking of these brakes at an inappropriate time during transistion to auxiliary system operation and thus essentially disabling the entire brake system. Accordingly, an auxiliary circuit is provided by this invention to prevent lockup of the brakes when the auxiliary or secondary brake system is energized. This auxiliary system includes a second set of reservoir tanks 99 having a conduit 100 that interconnects with the lockup cylinder 83 through the conduit 96 and also connects with the conduit 89 leading to the brave valve 90. This latter connection thus provides a secondary source of air for enabling normal operation of the brakes and preventing operation of the lockup mechanism.

Control of operation of the lockup cylinder 83 and the brake system is through solenoid actuated selector valves 101 and 102 which determine whether pressurized air is obtained from either the primary reservoir tanks 81 or the secondary reversoir tanks 99. These two similar valves are of a two-position type having axially displaceable spools 101a, 102a which are shown in the position for operation where the brake system and lockup cylinders are supplied with pressurized air from the primary reservoir tanks 81. Each valve includes a mechanical spring 101b, 102b which biases the spool to the position other than that illustrated in opposition to an air solenoid 101c, 102c, each of which form respective first actuating means, integrally formed in the valve structure. Pressurized air is routed from the primary reservoir tanks 81 to these air solenoids 102c, 101c through the branch conduits 88a and 96a. The springs 101b, 102b are selected to be of a strength such that they will displace the respective spools 101a, 102a to the second position whenever the air pressure drops below a predetermined level such as about 60 p.s.i. It will be noted that these valves 101, 102 are shown in the position where it is assumed that the primary reservoir tanks 81 contain air pressurized to at least this level of 60 p.s.i. as would be the case where the systems and components are operating normally.

Also coupled with each valve 101, 102 are respective electric actuating solenoids 103, 104 which form respective second actuating means and which are effective, upon energization, to displace the spools to their other position in overriding opposition to the respective air solenoids 101c, 102c. Control over energization of the electric solenoids 103, 104 is effected through an electric circuit including a pressure responsive switch 105 which is connected to the conduit 96 and this switch is thus responsive to the pressure in the primary reservoir tanks 81. Associated with this pressure switch are a set of normally closed contacts 105a connected in circuit between the battery B and each of the solenoids 103, 104. Functioning of this switch which is designed to operate and open its associated contacts 105a when the system pressure increases to a predetermined level is to either maintain the valve spools 101a, 102a in the second position until pressure reaches this level or to displace the valve spools to the second position whenever the primary system air pressure drops to that level. In this illustrative system, the pressure switch 105 is designed to operate when a pressure of at least 65 p.s.i. is applied thereto.

Accordingly, upon initial startup of the brake system with both sets of reservoir tanks 81 and 99 essentially depleted, the valves 101 and 102 will have their spools displaced to the position not illustrated and any increase in air pressure throughout the system will be initiated through secondary reservoir tanks 99. When the air pressure increases to 60 p.s.i., the valve spools will not be shifted to the illustrated positions even though air solenoids 101c and 102c would overcome the counteracting force of the springs 101b and 102b. The pressure switch 105 will not then be actuated and an electric circuit is maintained to the solenoid 103 and 104 which will then maintain the valve spools in the second position. Once the air pressure increases to 65 p.s.i., the pressure switch 105 is actuated to open its contacts 105a and deenergize the solenoids thereby permitting the air solenoids 101c, 102c to shift the valve spools 101a, 102a to the illustrated position and enabling normal functioning of the brake systems. This arrangement of air circuits and valves 101 and 102, prevents the inadvertent lockup of the brakes at the time of a system failure resulting in automatic switching to the auxiliary system.

When the air pressure is bled off or if the pressure should inadvertently drop below a predetermined level, such as approximately 65 pounds per square inch, the spool will be shifted to the other of its positions by energization of electrical solenoids 104 and 105. If the pressure in the primary supply conduits 88 and 96 drop below the operating point of switch 105, which switch is set to operate approximately 65 p.s.i., this switch will operate and permit the associated contacts 105a to close and energize the respective solenoids thereby displacing the spools of the valves to the secondary position. This then would interconnect the secondary air supply system from the reservoir 99 through conduit 100 and the valves 101 and 102 and thus maintain the operation of the brakes in the normal manner and prevent operation of the lockup cylinders 88. Thus it will be seen that with the valve spools 101a, and 102a in the second position, the system will be functional to again maintain the normal operation of the brake system. However, both the lockup and the brake system are now being supplied by the auxiliary reservoir tanks 99.

To prevent this dissipation of the air pressure that is built up in either set of reservoir tanks 81 or 99, conduit 87 and the conduit 107 supplying the auxiliary tanks 99 are provided with respective check valves 108 and 109 that are located at the inlet side of these reservoirs. Consequently, the loss of air pressure in either system, or failure of the compressor 80, will not result in depletion of the air in the other set of tanks. A manually operated bleed valve 110, 111 may be provided with each set of reservoir tanks 81, 99 to permit complete depletion of air pressure in both systems when desired.

It will be readily apparent from the preceding detailed description of the embodiments of this invention that a vehicle braking system is provided which substantially enhances safety. The system is automatically operable without requiring any action by the vehicle operator in detecting a failure in the primary brake system or in affecting actuation of the secondary or auxiliary system. The systems operate without any substantial loss of hydraulic fluid or pressurized air as a consequence of failure of the primary system thereby avoiding degradation of the secondary system. Although the primary system may fail, the vehicle may continue to be operated with a fully operational hydraulic brake system thereby avoiding immediate disabling of the vehicle.

Having thus described this invention, what is claimed is:

1. A vehicle braking system comprising
    a brake actuating cylinder at a wheel of the vehicle, said cylinder actuable through application of pressurized fluid thereto to operate a brake mechanism of the wheel,
    a master brake cylinder including a piston having a brake pedal connected thereto and selectively operable within said master brake cylinder to effect application of pressurized fluid in the brake system,
    a first fluid circuit connected between said master cylinder and said brake actuating cylinder,
    a second fluid circuit connected between said master cylinder and said brake actuating cylinder, and
    a solenoid operated valve interconnected in said first and second circuits and normally in a first position connecting said first circuit in fluid communicating relationship between said master cylinder and brake actuating cylinder, a fluid pressure responsive switch operative independently of displacement of said brake pedal to any predetermined position and responsive to fluid pressure in said first circuit, a fluid pressure responsive circuit connected to said fluid responsive switch and interconnected with said solenoid operated valve to operate said valve to a second position when said master cylinder piston is displaced to alternatively connect said second circuit in fluid communicating relationship between said master cylinder and brake actuating cylinder when fluid pressure in said first circuit does not increase to at least a predetermined minimum value.

2. A vehicle braking system according to claim 1 wherein said fluid pressure responsive circuit includes circuit enabling means, said circuit enabling means mechanically coupled with said master brake cylinder and responsive to actuation thereof to pressurize the fluid circuits, said enabling means operative to enable said fluid pressure responsive circuit upon displacement of said master brake cylinder piston from an initial, non-braking position.

3. A vehicle braking system according to claim 2 wherein said valve solenoid is electrical and when energized, actuates said valve to said second position and said fluid pressure responsive circuit includes an electric power source, said fluid pressure responsive switch having a set of normally open switch contacts that are closed upon increase in fluid pressure to at least said predetermined value, and electric circuit means interconnecting said valve solenoid, pressure responsive switch contacts, circuit enabling means and electric power source whereby upon displacement of said master brake cylinder from said initial, non-braking position and failure of fluid pressure in said first fluid circuit to increase to at least said predetermined value results in energization of said valve solenoid.

4. A vehicle braking system according to claim 3 wherein said circuit enabling means includes normally-open electrical switch contacts.

5. A vehicle braking system according to claim 4 wherein said electric circuit means includes a relay switch having a normally-closed set of contacts series connected with said valve solenoid, electrical power source and normally open switch contacts of said circuit enabling means, said relay switch also including an operating coil series connected with said electrical power source and contacts of said pressure responsive switch whereby said relay switch coil is energized to open the contacts thereof prior to closing of said enabling switch contacts upon pressurization of said first fluid circuit to at least the predetermined minimum value.

6. A vehicle braking system according to claim 5 wherein said circuit enabling means includes second normally-open electrical switch contacts, said second switch contacts series connected with said pressure responsive switch contacts to prevent energization of said relay switch coil until said master brake cylinder piston is displaced.

7. A vehicle braking system according to claim 1 wherein said solenoid operated valve is locked in the second position when once actuated.

8. A vehicle braking system according to claim 1 which includes a fluid reservoir and wherein said solenoid operated valve normally connects said second circuit with said reservoir.

9. A vehicle braking system according to claim 1 which includes a fluid reservoir and wherein said solenoid operated valve is operative to normally connect said second fluid circuit with said reservoir and to alternatively connect said first fluid circuit with said reservoir.

10. A vehicle braking system according to claim 1 which includes a second valve that is interconnected between said first and second circuits and said brake actuating cylinder, said second valve including a valve element alternatively positionable in fluid blocking relationship to either said first or second circuit preventing fluid communication between the blocked circuit and the brake actuating cylinder.

11. A vehicle braking system according to claim 10 wherein said valve element of said second valve is responsive to fluid pressure in said first and second fluid circuits and is displaced to block the circuit with the lowest fluid pressure.

12. A vehicle braking system according to claim 1 wherein said brake actuating cylinder includes first and second cylinder and piston units with each unit connected in fluid communicating relationship with respective ones of said first and second fluid circuits with the pistons of each unit thereof selectively and independently extendable.

13. A vehicle braking system according to claim 12 which includes a bearing plate mechanically coupled with a wheel braking mechanism and wherein the pistons of said first and second cylinder and piston units are selectively coupled with said bearing plate for actuation of the brakes at the wheel.

14. A vehicle braking system according to claim 13 wherein the pistons of said first and second cylinder and piston units are coaxially disposed relative to each other with the piston of the first unit normally in coupled engagement with said bearing plate.

15. A vehicle braking system according to claim 13 wherein the piston of said first unit is of elongated cylindrical rod form and the piston of said second unit is of elongated cylindrical ring form and coaxially disposed to the first piston.

16. A vehicle braking system according to claim 15 wherein the outwardly projecting end of each piston is arcuately curved to releaseably interfit in a respective socket formed in said bearing plate.

17. A vehicle braking system according to claim 1 wherein said master brake cylinder includes first and second units including independent cylinders and pistons, each of said pistons mechanically coupled to the other and to said brake pedal, and said solenoid operated valve selectively operable to connect either said first fluid circuit with said first master brake cylinder unit or to connect said second fluid circuit with said second master brake cylinder unit for pressurization of only one fluid circuit upon actuation of said master brake cylinder.

18. A vehicle braking system according to claim 17 wherein said solenoid operated valve is operable to connect the fluid circuit and unit of said master brake cylinder not interconnected for pressurization to reservoir means.

19. A vehicle braking system according to claim 1 which includes a brake lockup cylinder mechanically coupled with said brake actuating cylinder and normally activating the brake mechanism, a source of pressurized fluid, and a fluid control circuit interconnected between said source and said lockup cylinder, said control circuit normally routing pressurized fluid to said lockup cylinder to maintain said lockup cylinder in a non-brake actuating position.

20. A vehicle braking system according to claim 19 wherein said brake actuating cylinder includes a cylinder and a piston reciprocable therein and mechanically coupled with the brake mechanism, and said lockup cylinder includes a cylinder, a piston reciprocable in the cylinder and having a piston rod axially projecting from the cylinder to mechanically couple with the brake mechanism for actuation thereof when extended, and biasing means coupled with and normally urging the piston rod to an extended position, said control circuit routing pressurized fluid to said lockup cylinder to prevent extension of the lockup cylinder piston when the force exerted by the pressurized fluid exceeds the force exerted by said biasing means.

21. A vehicle braking system according to claim 19 wherein said source of pressurized fluid includes a primary source and a secondary source and said control circuit includes selector valve means operable to alternatively connect either the primary or secondary source to said lockup cylinder, said selector valve means responsive to fluid pressure of the primary source to connect the primary source to the lockup cylinder when the fluid pressure exceeds a predetermined level.

22. A vehicle braking system according to claim 21 wherein said selector valve means includes a movable valve element, biasing means coupled with and normally urging the valve element to a position where the secondary source is connected with the lockup cylinder, and first actuating means coupled with the valve element and operable to move the valve element to a position where the primary source is connected with the lockup cylinder, said first actuating means responsive to fluid pressure of the primary source and operable when the pressure exceeds the predetermined level.

23. A vehicle braking system according to claim 22 wherein said selector valve means includes second actuating means coupled with the valve element and operable to move the valve element to the position connecting the secondary source with the lockup cylinder when the pressure of the primary source does not exceed a predetermined level which is greater than said first mentioned pressure level, said second actuating means coupled with and responsive to the pressure of the primary source.

24. A vehicle braking system according to claim 23 wherein said second actuating means includes an electric solenoid mechanically coupled with the valve element, and an electric circuit including an electric power source and a second pressure responsive switch connected with said solenoid, said second pressure responsive switch having a set of normally closed contacts connected in the electric circuit with said switch being responsive to the pressure of said primary pressurized fluid source.

25. A vehicle braking system according to claim 24 wherein said first and second fluid circuits are selectively connectable to either the primary or secondary source by said selector valve means.

26. A vehicle braking system according to claim 21 wherein said first and second fluid circuits are selectively connectable to either the primary or secondary source by said selector valve means.

27. A vehicle braking system according to claim 21 wherein the primary and secondary pressurized fluid sources each include reservoir tanks and said pressurized fluid is compressed air.

28. A vehicle braking system according to claim 1 in which the fluid therein is a hydraulic fluid.

* * * * *